US009638280B2

(12) United States Patent
Nowaczyk et al.

(10) Patent No.: US 9,638,280 B2
(45) Date of Patent: May 2, 2017

(54) SHOCK ABSORBER WITH FREQUENCY DEPENDENT PASSIVE VALVE

(71) Applicant: Tenneco Automotive Operating Company Inc., Lake Forest, IL (US)

(72) Inventors: Mark Nowaczyk, Heers (BE); Jelle Van de Plas, Aarschot (BE); Jan Vochten, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/878,397

(22) Filed: Oct. 8, 2015

(65) Prior Publication Data

US 2016/0025181 A1    Jan. 28, 2016

Related U.S. Application Data

(63) Continuation-in-part of application No. 13/975,454, filed on Aug. 26, 2013, now Pat. No. 9,239,092.

(51) Int. Cl.
*F16F 9/348* (2006.01)
*F16F 9/50* (2006.01)
*F16F 9/512* (2006.01)

(52) U.S. Cl.
CPC ............ *F16F 9/5126* (2013.01); *F16F 9/348* (2013.01); *F16F 9/50* (2013.01)

(58) Field of Classification Search
CPC .... F16F 9/34; F16F 9/348; F16F 9/512; F16F 9/062; F16F 9/3484; F16F 9/3482;

(Continued)

(56) References Cited

U.S. PATENT DOCUMENTS 1,268,452 A    6/1918    Goodyear
2,640,564 A *  6/1953    Cloudsley ............. F16F 9/3235
                                              137/470

(Continued)

FOREIGN PATENT DOCUMENTS

DE    4327358 A1    10/1994
DE    60210652 T2    8/2006

(Continued)

OTHER PUBLICATIONS

U.S. Appl. No. 14/459,513, filed Aug. 14, 2014, Nowaczyk et al.

*Primary Examiner* — Bradley King
*Assistant Examiner* — Stephen Bowes
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The pressure tube is disposed within a reserve tube and a working fluid reservoir is formed between the pressure tube and the reserve tube. The piston assembly divides the pressure tube into an upper working chamber and a lower working chamber. A base valve assembly controls a flow of working fluid between the working fluid reservoir and the lower working chamber. The base valve assembly includes a frequency dependent valve system that provides an increased level of damping for each compression stroke of the piston assembly during low frequency movements of the shock absorber. A lesser level of damping is provided for each compression stroke during high frequency movements of the shock absorber.

17 Claims, 7 Drawing Sheets

(58) Field of Classification Search
CPC .......... F16F 9/3485; F16F 9/3488; F16F 9/50;
F16F 9/5126; F16F 2228/04
USPC .................................................... 188/322.14
See application file for complete search history.

(56) References Cited

U.S. PATENT DOCUMENTS

| | | |
|---|---|---|
| 2,911,072 A | 11/1959 | Becker et al. |
| 3,570,635 A | 3/1971 | Takagi |
| 4,442,926 A | 4/1984 | Muto |
| 4,453,638 A | 6/1984 | Wallace |
| 4,515,252 A | 5/1985 | Hidaka et al. |
| 4,953,671 A | 9/1990 | Imaizumi |
| 5,018,608 A | 5/1991 | Imaizumi |
| 5,129,488 A | 7/1992 | Furuya et al. |
| 5,139,119 A | 8/1992 | Karnopp |
| 5,248,014 A | 9/1993 | Ashiba |
| 5,261,448 A | 11/1993 | Furuya et al. |
| 5,386,892 A | 2/1995 | Ashiba |
| 5,423,402 A | 6/1995 | de Kock |
| 5,467,852 A | 11/1995 | de Kock |
| 6,264,015 B1 | 7/2001 | De Kock |
| 6,290,035 B1 | 9/2001 | Kazmirski et al. |
| 6,334,516 B1 | 1/2002 | Shirley et al. |
| 6,450,304 B1 | 9/2002 | Miller et al. |
| 6,474,454 B2 | 11/2002 | Matsumoto et al. |
| 6,668,986 B2 | 12/2003 | Moradmand et al. |
| 7,395,907 B2 | 7/2008 | de Kock et al. |
| 7,699,148 B2 | 4/2010 | Forster |
| 7,958,981 B2 | 6/2011 | Teraoka et al. |
| 8,967,344 B2 | 3/2015 | Park |
| 9,080,634 B2 | 7/2015 | Nowaczyk et al. |
| 2004/0200946 A1 | 10/2004 | Pradel et al. |
| 2005/0045440 A1 | 3/2005 | Kock et al. |
| 2006/0283675 A1 | 12/2006 | Teraoka et al. |
| 2012/0160620 A1 | 6/2012 | Yamashita et al. |
| 2012/0160624 A1 | 6/2012 | Katayama et al. |
| 2012/0217106 A1 | 8/2012 | O'Flynn et al. |
| 2013/0048451 A1 | 2/2013 | Yamashita |
| 2013/0056317 A1 | 3/2013 | Kim |
| 2013/0140117 A1 | 6/2013 | Yu |
| 2014/0048365 A1 | 2/2014 | Kim |
| 2014/0048366 A1 | 2/2014 | Lee et al. |
| 2015/0047936 A1 | 2/2015 | Slusarczyk et al. |
| 2015/0053518 A1 | 2/2015 | Nowaczyk et al. |
| 2015/0247546 A1 | 9/2015 | Nowaczyk et al. |
| 2016/0047432 A1* | 2/2016 | Nowaczyk ............ F16F 9/3488 188/280 |

FOREIGN PATENT DOCUMENTS

| | | | |
|---|---|---|---|
| EP | 1442227 B1 | 4/2006 | |
| FR | 1064843 | 5/1954 | |
| JP | 56080541 A * | 7/1981 | |
| JP | 58065340 A * | 4/1983 | |
| JP | 60129443 A * | 7/1985 | |
| JP | 63083424 A * | 4/1988 | |
| JP | 03129137 A | 6/1991 | |
| JP | 05141468 A * | 6/1993 | |
| JP | 07-174183 | 7/1995 | |
| JP | 07-217696 | 8/1995 | |
| JP | 08-135715 | 5/1996 | |
| JP | 1906046 A1 * | 4/2008 | ............ F16F 9/348 |
| JP | 2011007213 A | 1/2011 | |
| JP | 2012-067880 A | 4/2012 | |
| JP | 05302639 B2 | 10/2013 | |
| KR | 20140022583 A | 2/2014 | |
| WO | 2011120119 A1 | 10/2011 | |
| WO | 2013051934 A1 | 4/2013 | |
| WO | 2014104876 A1 | 7/2014 | |

* cited by examiner

SHOCK ABSORBER WITH FREQUENCY DEPENDENT PASSIVE VALVE

CROSS REFERENCE TO RELATED APPLICATIONS

The present application is a continuation-in-part application of U.S. application Ser. No. 13/975,454, filed Aug. 26, 2013, which is presently allowed, the disclosure of which is hereby incorporated by reference into the present application.

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in rebound and compression strokes.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during an extension or rebound movement of the hydraulic damper or shock absorber.

The continued development of hydraulic dampers includes the development of frequency dependent damping devices that improve the function in an extension/rebound movement or a compression movement of the hydraulic damper or shock absorber.

SUMMARY OF THE INVENTION

In one aspect the present disclosure relates to a shock absorber having a pressure tube defining a fluid chamber for containing a working fluid. The shock absorber also includes a reserve tube, with the pressure tube being disposed within the reserve tube to define a working fluid reservoir between the pressure tube and the reserve tube. A piston assembly is disposed within the pressure tube and secured to a piston rod, the piston assembly dividing the fluid chamber into an upper working chamber and a lower working chamber. A base valve assembly is disposed between the lower working chamber and the working fluid reservoir. The base valve assembly includes a frequency dependent valve system operable to act as a bypass to allow a portion of the working fluid to pass therethrough during high frequency movements of the shock absorber during each compression stroke of the piston assembly, to thus provide a minimum degree of damping. The frequency dependent valve system also is operable to at least substantially interrupt a flow of the working fluid therethrough during low frequency movements of the shock absorber during each of the compression strokes, to thus provide increased damping.

In another aspect the present disclosure relates to a shock absorber comprising a pressure tube defining a fluid chamber for containing a working fluid, and a reserve tube. The pressure tube is disposed within the reserve tube to define a working fluid reservoir between the pressure tube and the reserve tube. A piston assembly disposed within the pressure tube and secured to a piston rod, the piston assembly disposed dividing said fluid chamber into an upper working chamber and a lower working chamber. A base valve assembly is disposed between the lower working chamber and the working fluid reservoir. The base valve assembly includes a frequency dependent valve system including an axially slidable spool valve responsive to a flow of the working fluid during a compression stroke, a valve seat plate in contact with a distal end of the spool valve, an interface member in contact with the valve seat plate, and a biasing element for biasing the interface member into contact with the valve seat plate. The spool valve experiences only a relatively small degree of movement during a high frequency, short duration compression stroke of the piston assembly, thus allowing fluid pressure to urge the interface member away from the valve seat plate and allow a flow of the working fluid therebetween to the working fluid reservoir, to thus reduce a damping provided by the shock absorber. During a low frequency, long duration compression stroke, the spool valve moves a greater axial distance than during the high frequency compression stroke, and thus causes the spool valve to apply sufficient pressure to the valve seat plate to at least substantially close off a flow of the working fluid between the interface member and the valve seat plate, to thus increase a damping provided by the shock absorber.

In still another aspect the present disclosure relates to a method for forming a shock absorber responsive to high and low frequency movements of the shock absorber during a compression stroke of a piston, to provide different levels of damping. The method comprises using a pressure tube to define a fluid chamber for containing a working fluid. The method also comprises using a reserve tube, with the pressure tube being disposed within the reserve tube, to define a working fluid reservoir between the pressure tube and the reserve tube. A piston assembly is also used which is disposed within the pressure tube and secured to a piston rod, to divide the fluid chamber into an upper working chamber and a lower working chamber. A base valve assembly is used which is disposed between the lower working chamber and the working fluid reservoir. The base valve assembly controls a flow of the working fluid between the lower working chamber and the working fluid reservoir. The method further includes configuring the base valve to utilize an axially slidable spool valve responsive to a pressure of the working fluid during a compression stroke of the piston assembly. In this manner the spool valve helps to form a bypass flow path during high frequency movements of the shock absorber during each compression stroke of the piston assembly, to thus provide a minimum degree of damping. The spool valve is also used to at least substantially interrupt a flow of the working fluid therethrough during low frequency movements of the shock absorber during each one of the compression strokes. This provides an increased degree of damping greater than the minimum degree of damping during the low frequency movements of the shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
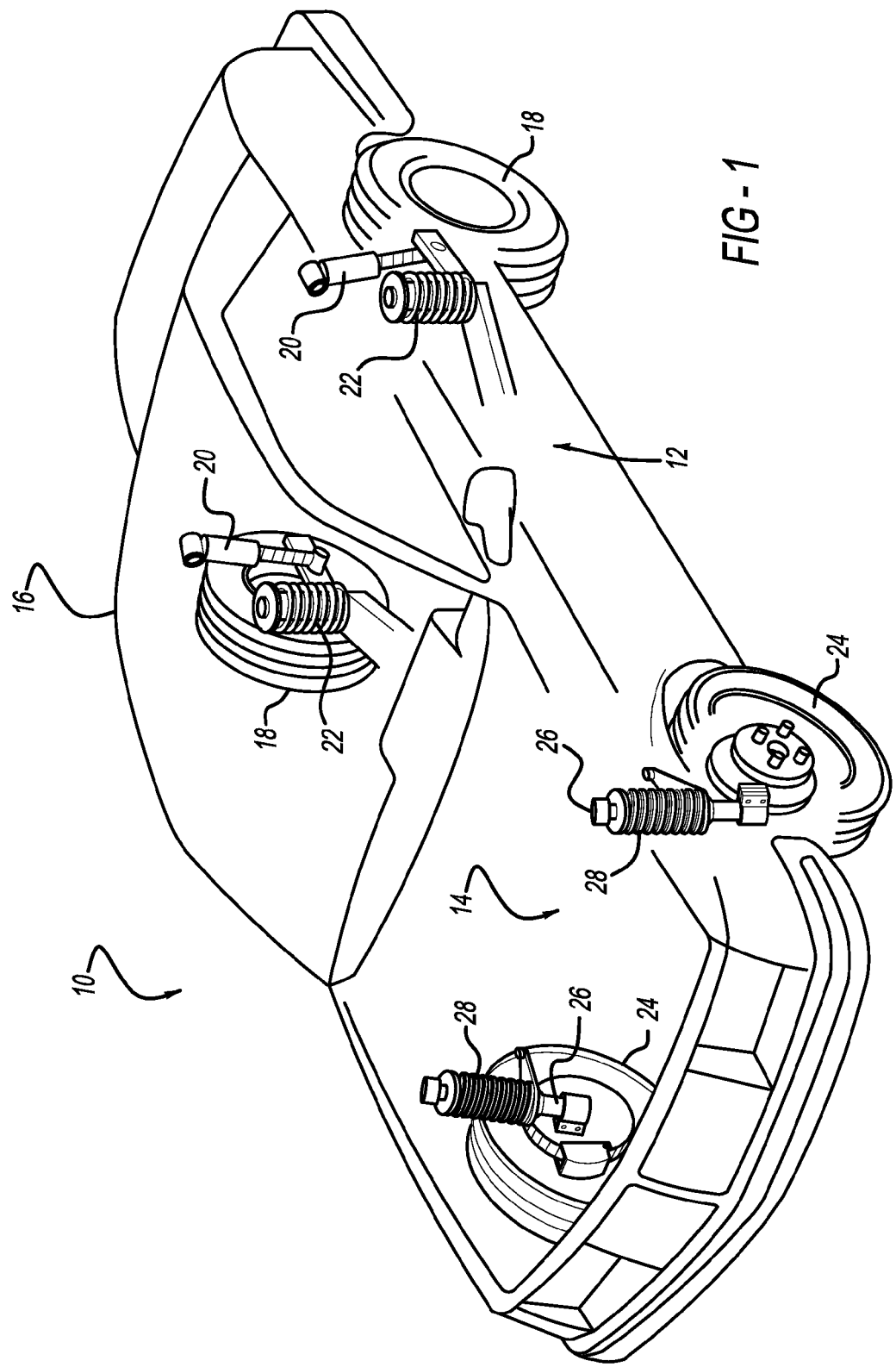
FIG. 1 is an illustration of an automobile using shock absorbers incorporating the frequency dependent damping device in accordance with the present disclosure.

Referring now to the drawings in which like reference numerals designate like or corresponding parts throughout the several views, there, is shown in FIG. 1 a vehicle incorporating a suspension system having the frequency dependent shock absorbers in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
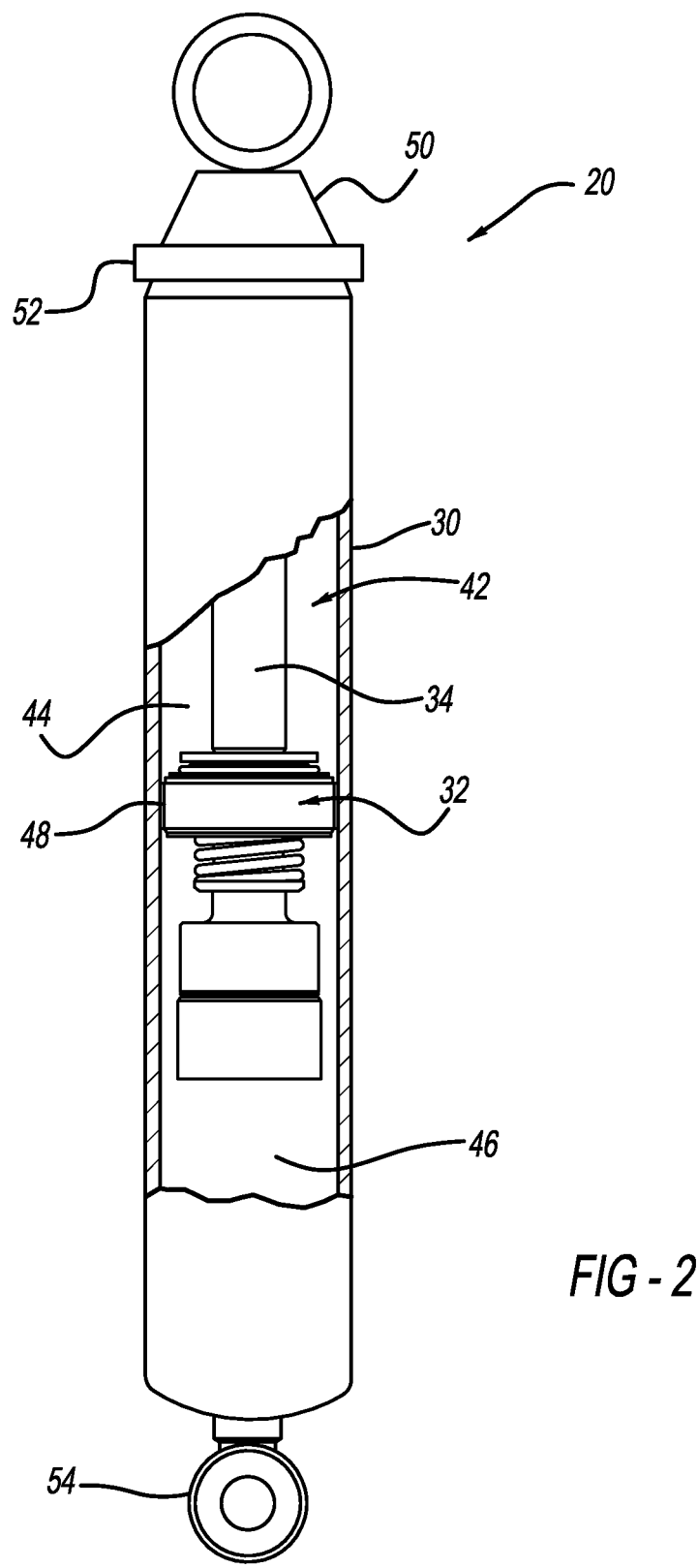
FIG. 2 is a cross-sectional side view of a monotube shock absorber incorporating either one the frequency dependent damping devices in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
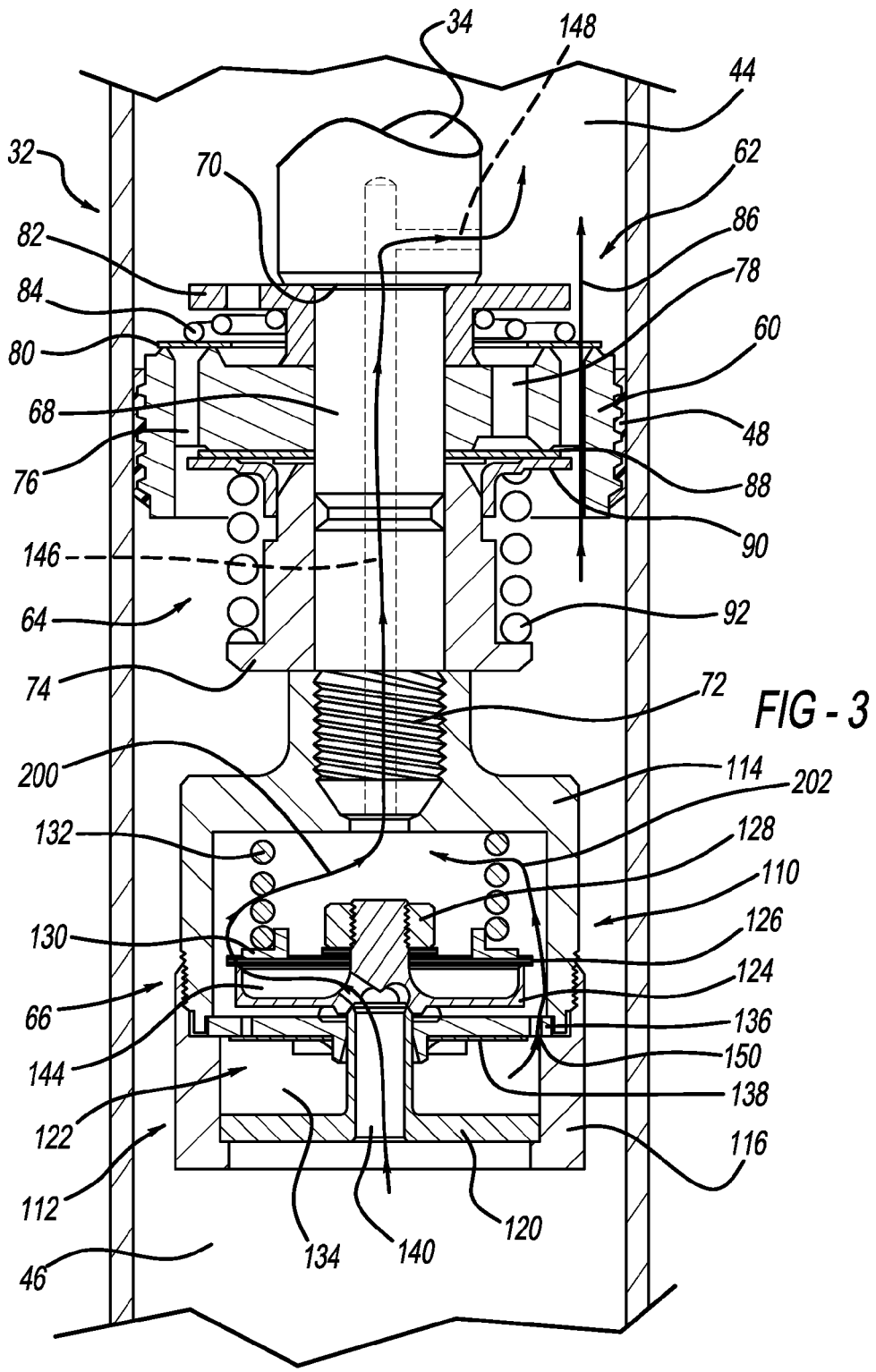
FIG. 3 is an enlarged cross-sectional side view illustrating a piston assembly of the shock absorber shown in FIG. 2 during incorporating a frequency dependent damping device which functions during a compression stroke of the shock absorber.
Figure 4:
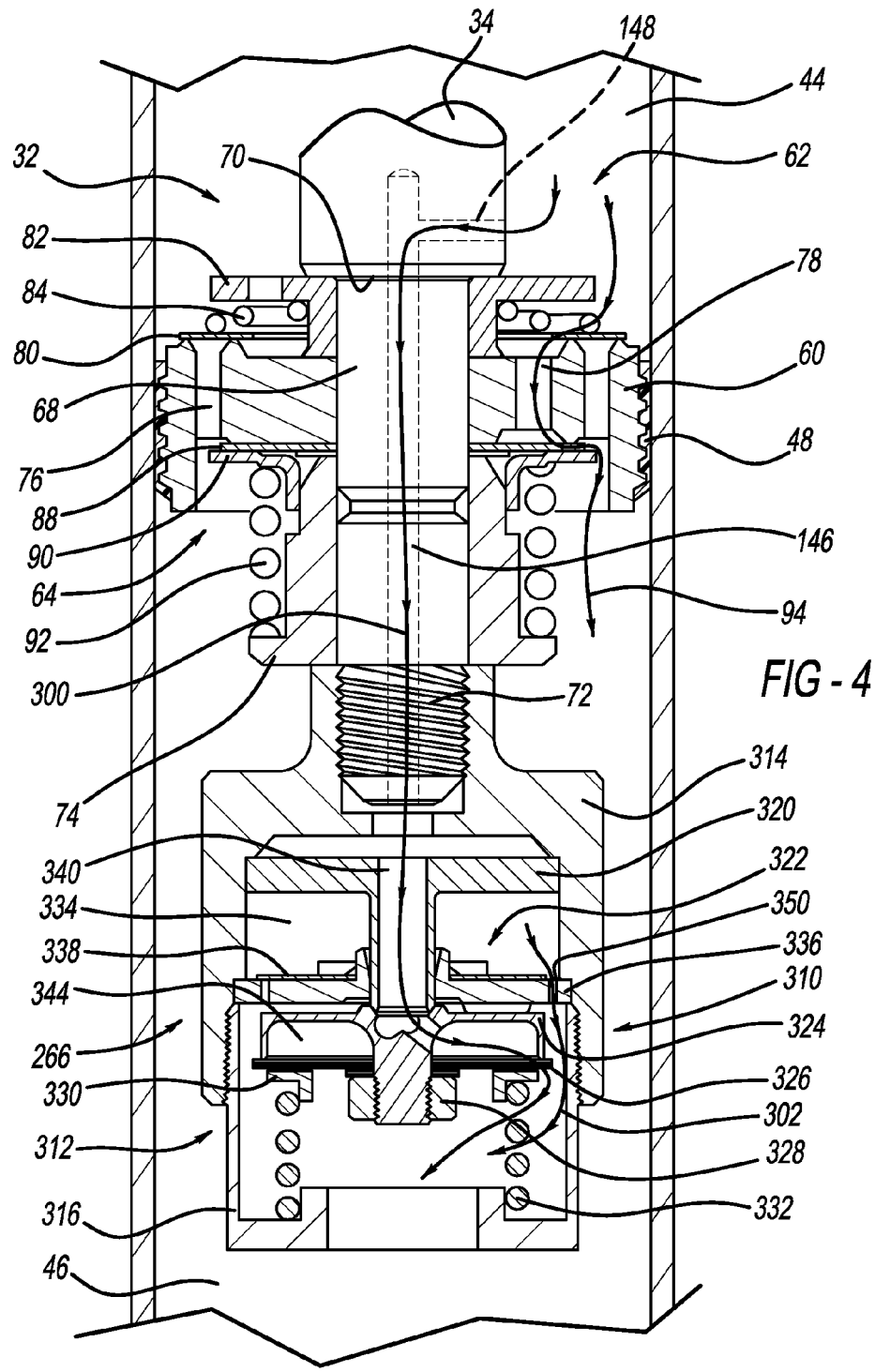
FIG. 4 is an enlarged cross-sectional side view illustrating a piston assembly of the shock absorber shown in FIG. 2 during incorporating a frequency dependent device which functions during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a frequency dependent valve assembly 66 illustrated in FIG. 3 or a frequency dependent valve assembly 266 illustrated in FIG. 4. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70 and with rebound valve assembly 64 being located between piston body 60 and a threaded end 72 of piston rod 34. A retaining nut 74 is threadingly or slidingly received on threaded end 72 or reduced diameter section 68 of piston rod 34 to secure piston body 60, compression valve assembly 62 and extension or rebound valve assembly 64 to piston rod 34. Piston body 60 defines a plurality of compression flow passages 76 and a plurality of rebound flow passages 78.

Compression valve assembly 62 comprises a compression valve plate 80, a valve stop 82 and a spring 84. Valve plate 80 is disposed adjacent to piston body 60 to cover the plurality of compression flow passages 76. Valve stop 82 is disposed adjacent shoulder 70 and spring 84 is disposed between valve plate 80 and valve stop 82 to bias valve plate 80 against piston body 60. During a compression stroke of shock absorber 20, fluid pressure builds up in lower working chamber 46 until the fluid pressure applied to valve plate 80 through compression flow passages 76 overcomes the load provided by spring 84. Valve plate 80 will move away from piston body 60 and compress spring 84 to open compression flow passages 76 to allow fluid to flow from lower working chamber 46 to upper working chamber 44 as shown by arrows 86 in FIG. 3.

Rebound valve assembly 64 comprises one or more valve plates 88, a spring seat 90 and a spring 92. Valve plates 88 are disposed adjacent to piston body 60 to cover the plurality of rebound flow passages 78. Spring seat 90 is disposed immediately adjacent valve plates 88. Spring 92 is disposed between spring seat 90 and retaining nut 74 to bias spring seat 90 against valve plates 88 and valve plates 88 against piston body 60. Retaining nut 74 is threaded onto threaded end 72 of piston rod 34 to retain valve plates 88 against piston body 60 to close rebound flow passages 78 using spring 92 and spring seat 90. During an extension stroke of shock absorber 20, fluid pressure builds up in upper working chamber 44 until the fluid pressure applied to valve plates 88 through rebound flow passages 78 overcomes the load provided by spring 92. Valve plates 88 will move away from piston body 60 and compress spring 92 to open rebound flow passages 78 to allow fluid to flow from upper working chamber 44 to lower working chamber 46 as shown by arrows 94 in FIG. 4.

Referring now to FIG. 3, frequency dependent valve assembly 66 is illustrated. Frequency dependent valve assembly 66 provides frequency dependent damping in compression only. FIG. 4 illustrates a frequency dependent valve assembly 266 for shock absorber 20 which provides frequency dependent damping in rebound (extension) only. Frequency dependent valve assembly 66 includes a housing assembly 110 and a spool valve assembly 112. Housing assembly 110 includes an upper housing 114 and a lower housing 116. Upper housing 114 is threadingly or otherwise attached to the end of piston rod 34. Lower housing 116 is threadingly or otherwise attached to upper housing 114.

Spool valve assembly 112 includes a spool valve 120, a check valve 122, an interface 124 and a plurality of valve discs 126 forming a bypass valve assembly, a retaining nut 128, a spring seat 130 and a spring 132. Spool valve 120 is disposed within a fluid cavity 134 defined by housing assembly 110. Check valve 122 includes a valve seat 136 and a valve plate 138. Spool valve 120 is slidably disposed within both valve seat 136 and housing assembly 110.

Interface 124 is disposed against spool valve 120. The plurality of valve discs 126 are disposed against interface 124. Retaining nut 128 is threadingly or otherwise received on interface 124 to retain the plurality of valve discs 126 on interface 124. Spring seat 130 is disposed against the plurality of valve discs 126 and spring 132 is disposed between housing assembly 110 and spring seat 130 to bias spring seat 130 against the plurality of valve discs 126 and the plurality of valve discs 126 against interface 124.

FIG. 3 illustrates fluid flow during a compression stroke of shock absorber 20. During a compression stroke, fluid pressure in lower working chamber 46 and in compression flow passages 76 will increase until the biasing load on valve plate 80 increases to the point that spring 84 is compressed and valve plate 80 is lifted entirely off of piston body 60 to fully open compression flow passages 76 as illustrated by arrow 86. Compression valve assembly 62 is a passive valve assembly with a firm damping characteristic.

At the beginning of the compression stroke, prior to the opening of compression valve assembly 62, fluid will flow through a bypass flow path illustrated by arrow 200 which bypasses piston body 60, compression valve assembly 62 and rebound valve assembly 64. Flow path 200 extends from lower working chamber 46 through an axial passage 140 in spool valve 120 into a bypass chamber 144 defined by interface 124 and the plurality of valve discs 126. Flow path 200 proceeds around the plurality of valve discs 126 into an axial fluid passage 146 and a radial passage 148 both extending through piston rod 34. During a high frequency movement, spool valve 120 moves only a small distance. Because of this small movement, the preload created by spring 132 is low and the fluid pressure in bypass chamber 144 will easily deflect the plurality of valve discs 126 to create the flow illustrated by arrow 200 which depicts flow through axial passage 146 and radial passage 148, both extending through piston rod 34 into upper working chamber 44. During a low frequency movement, spool valve 120 is able to move a significant distance. This larger movement will move interface 124, the plurality of valve discs 126 and spring seat 130. This movement will compress spring 132 which increases the preload generated by spring 132 and the fluid pressure required to separate the plurality of valve discs 126 from interface 124. As the load generated by spring 132 increases, the flow depicted by arrow 200 will decrease to provide a smooth transition from an initially soft damping condition to a firm damping condition for shock absorber 20. The slow closing of fluid flow 200 by the movement of spool valve 120 will provide the smooth transition. Arrow 202 depicts the flow of fluid out of fluid cavity 134 during movement of spool valve 120 during a compression stroke. Fluid flows from fluid cavity 134 through a tunable orifice 150 in valve seat 136 and into axial passage 146 which leads to radial passage 148 which leads to upper working chamber 44. Check valve 122 remains closed during this movement of spool valve 120 during a compression stroke and opens to allow for the return of fluid into fluid cavity 134 from upper working chamber 44 through radial passage 148 and through axial passage 146 during a rebound stroke.

Referring now to FIG. 4, frequency dependent valve assembly 266 is illustrated. Frequency dependent valve assembly 266 provides frequency dependent damping in rebound only. Frequency dependent valve assembly 266 includes a housing assembly 310 and a spool valve assembly 312. Housing assembly 310 includes an upper housing 314 and a lower housing 316. Upper housing 314 is threadingly or otherwise attached to the end of piston rod 34. Lower housing 316 is threadingly or otherwise attached to upper housing 314.

Spool valve assembly 312 includes a spool valve 320, a check valve 322, an interface 324 and a plurality of valve discs 326 forming a bypass valve assembly, a retaining nut 328, a spring seat 330 and a spring 332. Spool valve 320 is disposed within a fluid cavity 334 defined by housing assembly 310. Check valve 322 includes a valve seat 336 and a valve plate 338. Spool valve 320 is slidably disposed within both valve seat 336 and housing assembly 310. Valve seat 336 is fixedly attached to upper housing 314 by lower housing 316.

Interface 324 is disposed against spool valve 320. The plurality of valve discs 326 are disposed against interface 324. Retaining nut 328 is threadingly or otherwise received on interface 324 to retain the plurality of valve discs 326 on interface 324. Spring seat 330 is disposed against the plurality of valve discs 326 and spring 332 is disposed between housing assembly 310 and spring seat 330 to bias spring seat 330 against the plurality of valve discs 326 and the plurality of valve discs 326 against interface 324.

FIG. 4 illustrates fluid flow during a rebound stroke of shock absorber 20. During a rebound stroke, fluid pressure in upper working chamber 44 and in rebound flow passages 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke, prior to the opening of rebound valve assembly 64, fluid will flow through a flow path illustrated by arrow 300 which bypasses piston body 60, compression valve assembly 62 and rebound valve assembly 64. Flow path 300 extends from upper working chamber 44 through radial passageway 148 and axial passageway 146 both extending through piston rod 34, through an axial passage 340 in spool valve 320 into a bypass chamber 344 defined by interface 324 and the plurality of valve discs 326. Flow path 300 proceeds around the plurality of valve discs 326 and through an aperture in lower housing 316 into lower working chamber 46. During a high frequency movement, spool valve 320 moves only a small distance. Because of this small movement, the preload created by spring 332 is low and the fluid pressure in bypass chamber 344 will easily deflect the plurality of valve discs 326 to create the flow illustrated by arrow 300 which flows through the aperture extending through lower housing 316. During a low frequency movement, spool valve 320 is able to move a significant distance. This larger movement will move interface 324, the plurality of valve discs 326 and spring seat 330. This larger movement will compress spring 332 which increases the preload generated by spring 332 and the fluid pressure required to separate the plurality of valve discs 326 from interface 324. As the load generated by spring 332 increases, the flow depicted by arrow 300 will decrease to provide a smooth transition from an initially soft damping condition to a firm damping condition for shock absorber 20. The slow closing of fluid flow 300 by the movement of spool valve 320 will provide the smooth transition. Arrow 302 depicts the flow of fluid out of fluid cavity 334 during movement of spool valve 320 during a rebound stroke. Fluid flows from fluid cavity 334 through a tunable orifice 350 in valve seat 336 and into lower working chamber 46. Check valve 322 remains closed during this movement of spool valve 320 during a rebound stroke and opens to allow for the return of fluid into fluid cavity 334 from lower working chamber 46 during a compression stroke.

Figure 5:
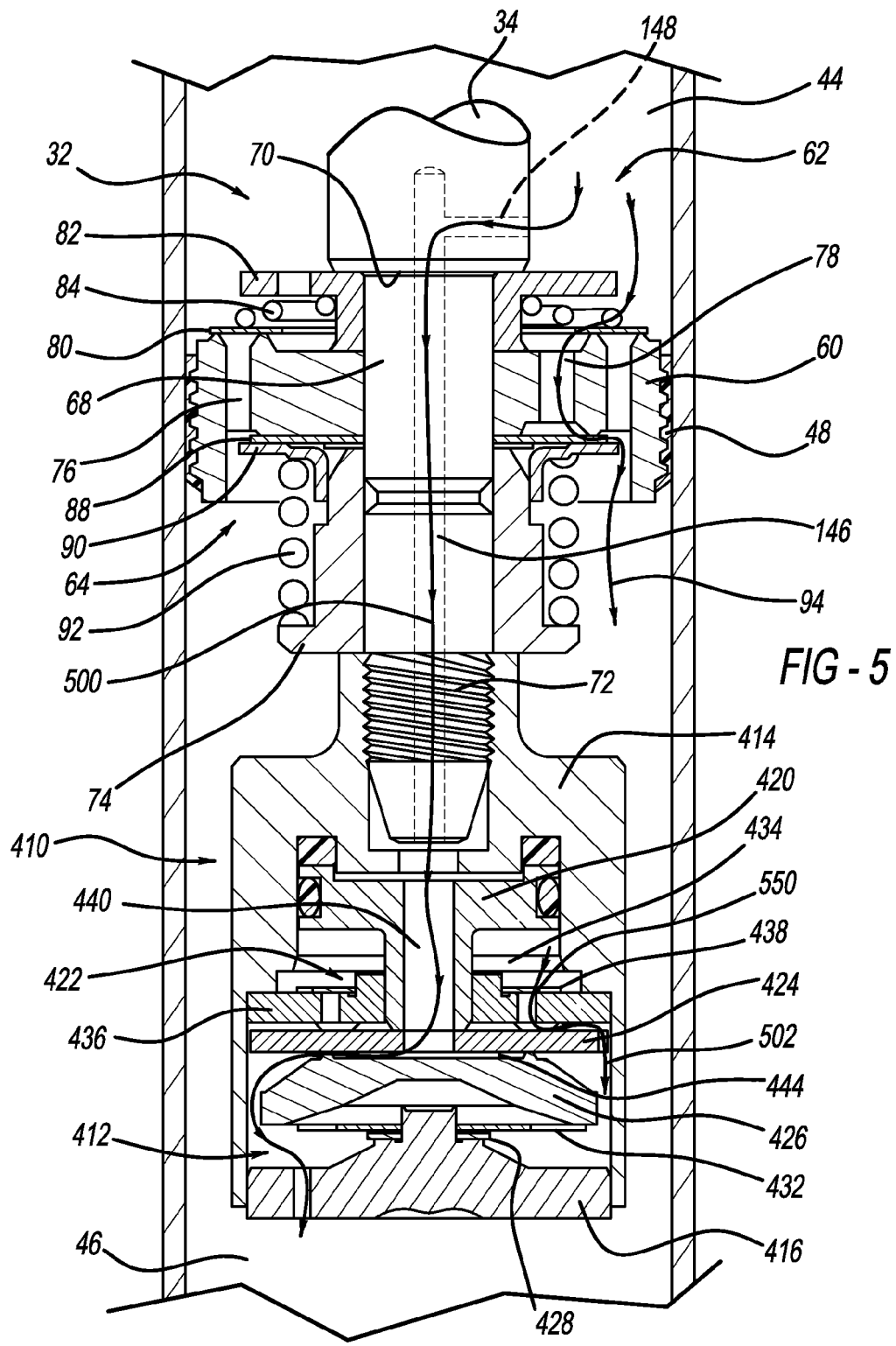
FIG. 5 is an enlarged cross-sectional side view illustrating a frequency dependent device in accordance with another embodiment of the present disclosure which functions during an extension stroke of the shock absorber.

Referring now to FIG. 5, a frequency dependent valve assembly 366 is shown in accordance with another embodiment of the present invention. Frequency dependent valve assembly 366 is a direct replacement for dependent valve assembly 266 as illustrated in FIG. 5. Frequency dependent valve assembly 366 provides frequency dependent damping in rebound/extension only. Frequency dependent valve assembly 366 includes a housing assembly 410 and a spool valve assembly 412. Housing assembly 410 includes an upper housing 414 and a lower housing 416. Upper housing 414 is threadingly or otherwise attached to the end of piston rod 34. Lower housing 416 is threadingly or otherwise attached to upper housing 414.

Spool valve assembly 412 includes a spool valve 420, a check valve 422, an interface 424, a valve body 426, one or more shim discs 428 and a spring 432. Spool valve 420 is disposed within a fluid cavity 434 defined by housing assembly 410. Check valve 422 includes a valve seat 436 and a valve plate 438. Spool valve 420 is slidably disposed within both valve seat 436 and housing assembly 410. Valve seat 436 is fixedly attached to upper housing 414. Interface 424 is disposed against spool valve 420. Valve seat 436 is disposed against interface 424. Spring 432 is disposed between lower housing 416 and valve body 426 to bias valve body 426 against interface 424. The one or more shim discs control the biasing load for spring 432. Interface 424, valve body 426 and spring 432 form a bypass valve assembly.

FIG. 5 illustrates fluid flow during a rebound stroke of shock absorber 20. During a rebound stroke, fluid pressure in upper working chamber 44 and in rebound flow passages 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke, prior to the opening of rebound valve assembly 64, fluid will flow through a flow path illustrated by arrow 500 which bypasses piston body 60, compression valve assembly 62 and rebound valve assembly 64. Flow path 500 extends from upper working chamber 44 through radial passageway 148 and axial passage 146 both extending through piston rod 34, through an axial passage 440 in spool valve 420 into a bypass chamber 444 defined by interface 424 and valve body 426. Flow path 500 proceeds around valve body 426 and through at least one aperture in lower housing 416 into lower working chamber 46. During a high frequency movement, spool valve 420 moves only a small distance. Because of this small movement, the preload created by spring 432 is low and the fluid pressure in bypass chamber 444 will easily separate valve body 426 from interface 424 to create the flow illustrated by arrow 500 which flows through the one or more apertures extending through lower housing 416. During a low frequency movement, spool valve 420 is able to move a significant distance. This larger movement will move interface 424 and valve body 426. This larger movement will compress spring 432 which increases the preload generated by spring 432 and the fluid pressure required to separate valve body 426 from interface 424. As the load generated by spring 432 increases, the flow depicted by arrow 500 will decrease to provide a smooth transition from an initially soft damping condition to a firm damping condition for shock absorber 20. The slow closing of fluid flow 500 by the movement of spool valve 420 will provide the smooth transition. Arrow 502 depicts the flow of fluid out of fluid cavity 434 during movement of spool valve 420 during rebound stroke. Fluid flows from fluid cavity 434 through a tunable orifice 550 in valve plate 438 and into lower working chamber 46. Check valve 422 remains closed during this movement of spool valve 420 in a rebound stroke and opens to allow for the return of fluid into fluid cavity 434 from lower working chamber 46 during a compression stroke.

Figure 6:
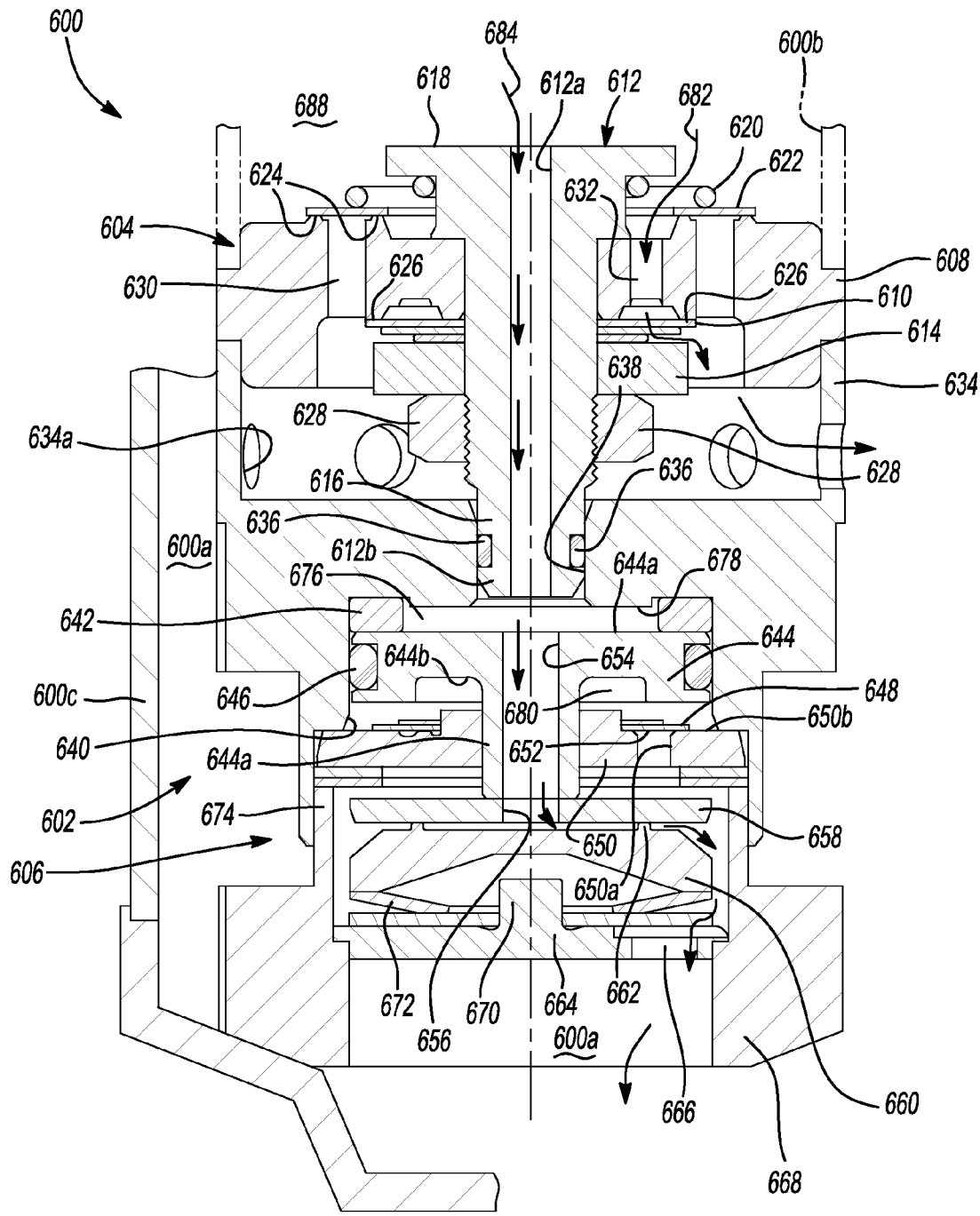
FIG. 6 is a high level cross-sectional side view illustrating a frequency dependent valve system incorporated in a base valve assembly of a dual tube shock absorber, and with a spool valve in a position which allows a flow of fluid through the spool valve during a high frequency movement of the shock absorber during a compression stroke of a rod mounted piston assembly, and which provides for a lesser degree of damping.

Referring now to FIG. 6, a shock absorber 600 having a base valve assembly 602 incorporating a compression valve assembly 604 and a frequency dependent valve system 606 is shown. The shock absorber 600 in this example is a dual tube shock absorber having a reservoir chamber 600*a* formed between a pressure tube 600*b* and a reserve tube 600*c*, as is well known in the art. The base valve assembly 602 controls the flow of a working fluid between the reservoir 600*a* and a working chamber of the shock absorber 600 as is also well known in the art.

The compression valve assembly 604 may have a cylinder end member 608, a compression valve disc stack 610, an upper valve pin 612 and a washer 614 secured to a neck 616 of the upper valve pin 612. The upper valve pin 612 has a bore 612*a* extending through its full axial length. The upper valve pin 612 also includes an enlarged head portion 618 that captures a biasing spring 620 and holds the biasing spring against an intake disc 622, to thus hold the intake disc 622 against a plurality of lands 624 on a first side of the cylinder end member 608. On a second side of the cylinder end member 608 the compression valve disc stack 610 is held against a plurality of lands 626 by the washer 614. The washer 614 is held in position on the upper valve pin 612 by a nut 628 which applies a predetermined torque to the compression valve disc stack 610. Lands 624 on the first side of the cylinder end member 608 are aligned with rebound flow channels 630 in the cylinder end member 608 while lands 626 are aligned with compression flow channels 632 extending through the cylinder end member 608.

The frequency dependent valve system 606 includes a valve connection member 634 which is secured to the cylinder end member 608 in any suitable manner, for example, by using a press fit or a threaded connection. The valve connection member 634 has at least one, but more preferably a plurality, of circumferentially spaced apart holes 634*a* which communicate with the reservoir chamber 600*a*. An O-ring 636 positioned adjacent a distal end 612*b* of the upper valve pin 612 provides a seal between the upper valve pin and a bore 638 extending axially through the valve connection member 634. The valve connection member 634 further includes a cavity 640 in which is disposed an annular end stop member 642, a spool valve 644, an O-ring 646, a check valve disc 648, a valve body 650 having a bypass bore 650*a*, and one or more shim discs 652.

The spool valve 644 has an axial flow passage 654 extending through its full axial length which is aligned with a bore 656 in a valve seat plate 658. The valve seat plate 658 is sandwiched between a distal end of a neck portion 644*a* of the spool valve 644 and an interface member 660. The interface member 660 includes an annular land 662 which contacts a generally planar surface of the valve seat plate 658. A lower valve pin 664 having a radially offset bore 666 is seated within a lower housing member 668. The lower valve pin 664 includes an axially formed boss 670 upon which a disc package 672 is mounted. Disc package 672 contacts a lower outer peripheral surface of the interface member 660 and acts as a biasing element (i.e., spring) to preload the interface member 660, and thus maintain the interface member 660 in contact with valve seat plate 658. The lower housing member 668 has a neck portion 674 which is secured within the cavity 640 such as by, for example, a press fit, a threaded connection, or by any other suitable connection arrangement.

The frequency dependent valve system 606 further includes a first or "upper" chamber 676 which is formed between an upper surface 644*a* of the spool valve 644 a lower radially inward portion 678 of the valve connection member 634, and a portion of the distal end 612*b* of the upper valve pin 612. A second or "lower" chamber 680 is formed between an upper surface 650*b* of the valve body 650 and a lower surface 644*b* of the spool valve 644.

Figure 7:
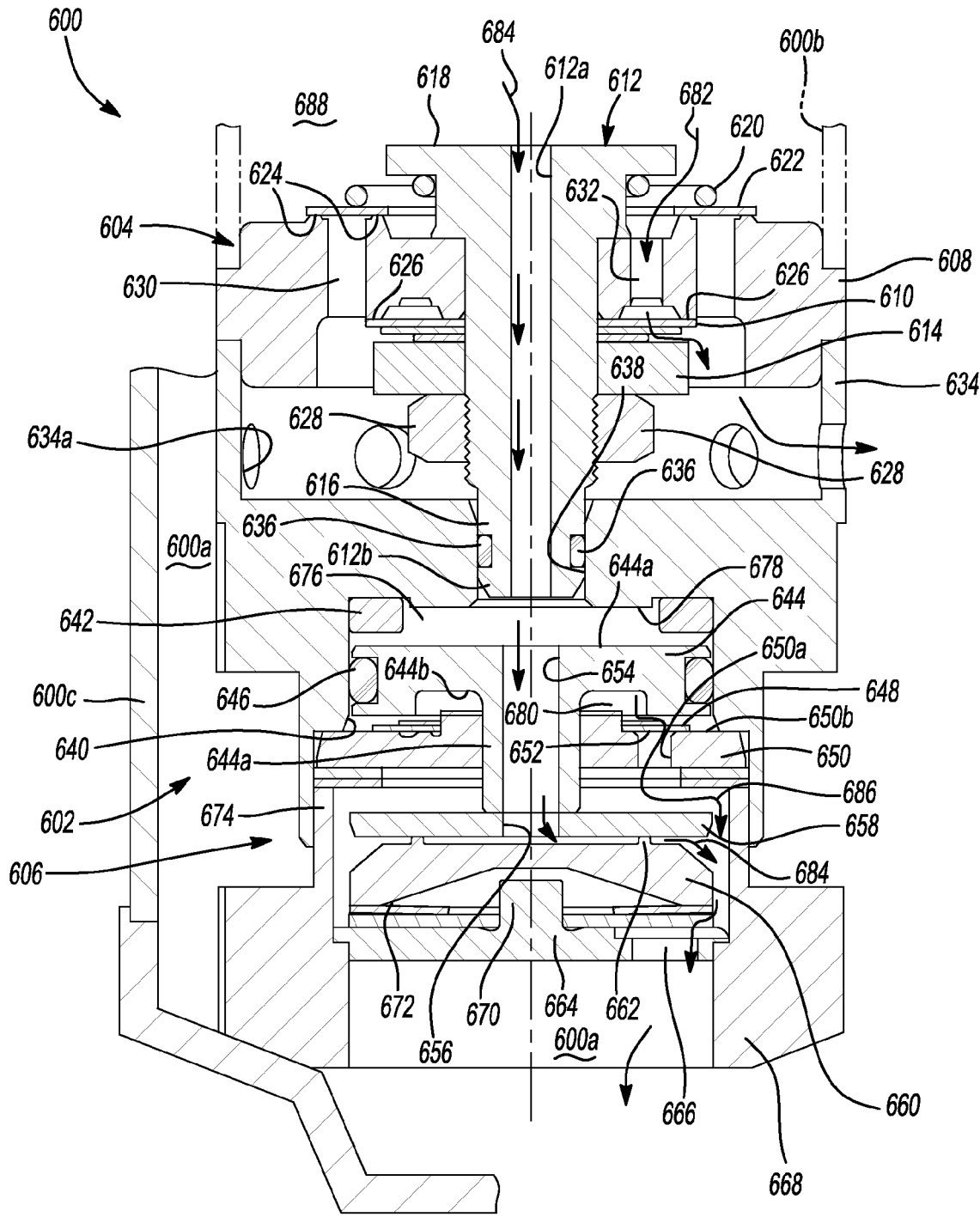
FIG. 7 is a view of the shock absorber of FIG. 6 but with the spool valve having been axially displaced by a sufficient buildup of fluid pressure on an upper surface of the spool valve during a low frequency movement of the shock absorber during a compression stroke, which effectively substantially reduces or completely interrupts a flow of the working fluid through the spool valve, which provides for an increased degree of damping.

With reference to FIG. 7, the base valve assembly 602 is shown with arrows 682 and 684 denoting the flows of working fluid during a compression stroke of the piston (not shown) within the lower working chamber of the shock absorber 600. The flow designated by arrow 686 occurs only when the working fluid is being forced out from the second (lower) chamber 680, as will be described in greater detail below. The lower working chamber within the pressure tube 600*b* is the area denoted by reference number 688 in FIG. 7 and is that area within the interior of the pressure tube 600*b* below the rod mounted piston, and above the base valve assembly 602. During the compression stroke a flow of working fluid 682 flows through the compression flow path channels 632 in the cylinder end member 608, through compression disc stack 610, through the holes 634*a* in the valve connection member 634 and into the reservoir chamber 600*a*.

During the compression stroke a portion of the working fluid in the lower working chamber 688, indicated by the flow 684, also flows through the bore 612*a* in the upper valve pin 612, through the annular end stop member 642, through the bore 654 in the spool valve 644, through the bore 656 in the valve seat plate 658, around the perimeter of the interface member 660, through the radially offset bore 666 in the lower valve pin 664 and into the reservoir chamber 600*a*. During a high frequency movement of the shock absorber 600 there is insufficient time to displace the fluid in the second (lower) chamber 680. As such, the spool valve 644 moves only a very slight distance. The pressure applied by the spool valve 644 on the interface member 660 is therefore at a minimum predetermined force which allows the pressure behind the fluid flow 684 to easily displace the interface member 660, against the biasing force from disc package 672, from the valve seat plate 658. This allows the fluid flow 684 to flow between the interface member 660 and the valve seat plate 658, around the periphery of the interface member 660 and through the radially offset bore 666 in the lower valve pin 664. During this condition there is little or no flow of fluid out from the second chamber 680 through the bypass bore 650*a*. So during a high frequency compression stroke two paths for fluid flow exist: 1) through the holes 634*a* in the valve connection member 634, and 2) through the spool valve 644 into the reservoir chamber 600*a*. The damping provided by the shock absorber 600 during this condition will be at, or close to, a minimum. This provides a softer ride for the vehicle that the shock absorber 600 is being used with.

During a longer duration, low frequency movement of the shock absorber 600, the fluid flow 682 will be as described above for the short duration movement. However, the longer duration of the shock absorber movement provides sufficient time to displace the working fluid from the second (lower) chamber 680, which causes a greater movement of the spool valve 644 downwardly against the biasing force from the disc package 672, as shown in the drawing of FIG. 7. The fluid in the second chamber 680 is forced through the bypass bore 650*a*, around the perimeter of the valve seat plate 658, past the perimeter of the interface member 660 and through the radially offset bore 666 into the reservoir chamber 600*a*, as indicated by the fluid flow 686. The fluid pressure which has built up in the upper (i.e., first) chamber 676 forces the spool valve 644 axially downwardly in the drawing of FIG. 7 against the biasing force of the disc package 672, which significantly increases the biasing pressure applied by the spool valve 644 on the valve seat plate 658. As a result, the fluid flowing through the bore 654 of the spool valve 644 has insufficient pressure to displace the interface member 660 from the valve seat plate 658. This completely interrupts, or at least substantially reduces, the flow of working fluid through the spool valve 644 bore 654 and through the bypass bore 666, thus substantially or completely closing the frequency dependent valve system 606. All, or substantially all, of the working fluid during the compression stroke will thus be required to flow through the holes 634*a* in the valve connection member 634. The damping provided during this condition of low frequency shock absorber motion will be a maximum degree of damping. This provides the vehicle that the shock absorber 600 is being used on with a firm ride quality during low frequency compression movements of the shock absorber. The base valve assembly 602, with its frequency dependent valve system 606 described herein, may be implemented in a shock absorber which also includes a frequency dependent valve assembly integrated into the piston assembly. Thus, frequency dependent damping may be utilized in both the rebound and compression strokes of the piston assembly of the shock absorber.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
a pressure tube defining a fluid chamber for containing a working fluid;
a reserve tube, with the pressure tube being disposed within the reserve tube to define a working fluid reservoir between the pressure tube and the reserve tube;
a piston assembly disposed within the pressure tube and secured to a piston rod, the piston assembly disposed dividing said fluid chamber into an upper working chamber and a lower working chamber;
a base valve assembly disposed between the lower working chamber and the working fluid reservoir, the base valve assembly including a frequency dependent valve system operable to:
act as a bypass to allow a portion of the working fluid to pass therethrough during high frequency movements of the shock absorber during each compression stroke of the piston assembly, to thus provide a minimum degree of damping; and
to at least substantially interrupt a flow of the working fluid therethrough during low frequency movements of the shock absorber during each of the compression strokes, to thus provide increased damping;
the frequency dependent valve system further including:
a valve seat plate in contact with a distal end of a spool valve;
an interface member in contact with the valve seat plate;
a biasing element for biasing the interface member into contact with the valve seat plate and the distal end of the spool valve;
a valve body disposed between the spool valve and the valve seat plate, the valve body having a bypass flow path in communication with the working fluid reservoir; and
wherein a pressure of the working fluid acting on the spool valve during a compression stroke, and during a high frequency movement of the shock absorber, operates to force the interface member away from the valve seat plate permitting a flow of the working fluid therebetween.

2. The shock absorber of claim 1, wherein the interface member includes a land which contacts the valve seat plate.

3. The shock absorber of claim 2, wherein the base valve assembly further comprises an upper valve pin having a bore therethrough in communication with an axial bore of the spool valve.

4. The shock absorber of claim 1, wherein the frequency dependent valve system includes:
a first chamber formed adjacent a first side of the spool valve;
a second chamber formed between the spool valve and the valve body;
wherein during the high frequency movements of the shock absorber the time is insufficient to displace the working fluid from the second chamber, and does not allow the spool valve to move a sufficient distance to generate a force on the interface member which is sufficiently high to prevent the interface member from being lifted off of the valve seat plate, and thus the working fluid is able to lift the interface member from the valve seat plate to allow a flow of the working fluid therebetween; and
wherein during the low frequency movements of the shock absorber the movement of the spool valve is increased which displaces the fluid from the second chamber, and which forces the spool valve towards the lower housing member against the biasing force being provided by the biasing element, and thus generates a sufficient force that prevents the working fluid from lifting the interface member off of the valve seat plate.

5. The shock absorber of claim 1, wherein the base valve assembly further comprises:
an upper valve pin having a bore extending axially therethrough;
a cylinder end member for receiving the upper valve pin;
a valve connection member coupled to the cylinder end member and including a plurality of holes through which the working fluid flows, and a cavity within which the spool valve is disposed, the bore of the upper valve pin being in communication with the bore of the spool valve;
a lower valve pin in contact with the biasing element; and
a lower housing member secured to the valve connection member which supports the lower valve pin in a stationary manner.

6. The shock absorber of claim 5, further comprising a sealing element disposed between a peripheral wall portion of the spool valve and the cavity of the valve connection member.

7. A shock absorber comprising:
a pressure tube defining a fluid chamber for containing a working fluid;
a reserve tube, with the pressure tube being disposed within the reserve tube to define a working fluid reservoir between the pressure tube and the reserve tube;

a piston assembly disposed within the pressure tube and secured to a piston rod, the piston assembly dividing said fluid chamber into an upper working chamber and a lower working chamber;

a base valve assembly disposed between the lower working chamber and the working fluid reservoir, the base valve assembly including a frequency dependent valve system including:

an axially slidable spool valve responsive to a flow of the working fluid during a compression stroke;

a valve seat plate in contact with a distal end of the spool valve;

an interface member in contact with the valve seat plate;

a biasing element for biasing the interface member into contact with the valve seat plate;

the spool valve operable to experience only a relatively small degree of movement during a high frequency, short duration compression stroke of the piston assembly, thus allowing fluid pressure flowing through the spool valve to urge the interface member away from the valve seat plate and allow a flow of the working fluid therebetween to the working fluid reservoir, to thus reduce a damping provided by the shock absorber; and the spool valve operable during a low frequency, long duration compression stroke to experience a movement of a greater axial distance than during the high frequency compression stroke, which causes the spool valve to apply sufficient pressure to the valve seat plate to at least substantially close off a flow of the working fluid between the interface member and the valve seat plate, to thus increase a damping provided by the shock absorber.

8. The shock absorber of claim 7, wherein the frequency dependent valve assembly further comprises:

a first chamber adjacent a first side of the spool valve upon which fluid pressure from the working fluid acts during the compression stroke of the piston assembly;

a second chamber at least partially defined between a valve body and a second side of the spool valve; and wherein during the low frequency compression stroke the spool valve moves a sufficient distance to displace the working fluid in the second chamber, and applies sufficient pressure to the valve seat plate to at least substantially interrupt a flow of the working fluid through the spool valve.

9. The shock absorber of claim 7, wherein the interface member includes a land formed thereon for contacting the valve seat plate.

10. The shock absorber of claim 7, wherein the base valve assembly includes an upper valve pin in flow communication with a bore of the spool valve.

11. The shock absorber of claim 10, further comprising a cylinder end member in which the upper valve pin is disposed.

12. The shock absorber of claim 7, wherein the base valve assembly includes a lower valve pin in contact with the biasing element.

13. The shock absorber of claim 12, further comprising a lower housing member coupled to the valve connection member, and operable to hold the lower valve pin stationary within the base valve assembly.

14. The shock absorber of claim 7, further comprising a valve connection member having a cavity within which the spool valve is disposed for sliding axial movement.

15. The shock absorber of claim 14, further comprising an annular end stop member disposed within the cavity adjacent the first side of the spool valve, defining a stop for axial travel of the spool valve.

16. The shock absorber of claim 15, wherein the lower valve pin includes a boss portion about which the biasing element is mounted.

17. The shock absorber of claim 14, wherein the valve connection member includes a plurality of radially arranged holes for allowing fluid flow therethrough during both low frequency and high frequency compression strokes of the piston assembly.

* * * * *